Sept. 15, 1970 M. RIBNER 3,529,099

TELEPHONE SUBSET WITH RESISTIVE HYBRID NETWORK

Filed May 10, 1967

INVENTOR
MORRIS RIBNER
BY
[signature]
ATTORNEY

United States Patent Office 3,529,099
Patented Sept. 15, 1970

3,529,099
TELEPHONE SUBSET WITH RESISTIVE HYBRID NETWORK
Morris Ribner, Chicago, Ill., assignor to International Telephone and Telegraph Corporation, New York, N.Y., a corporation of Maryland
Filed May 10, 1967, Ser. No. 637,557
Int. Cl. H04m *1/58, 1/60*
U.S. Cl. 179—81 7 Claims

ABSTRACT OF THE DISCLOSURE

A non-inductive telephone network has a diamond-shaped bridge circuit with a pair of oppositely directed amplifiers in opposite arms thereof. The other two opposite arms of the bridge are resistive and capacitive. A difference amplifier is coupled across diagonal node points on the bridge. The other two node points on the bridge are connected to a telephone line.

This invention relates to telephone subsets and more particularly to subsets having resistive hybrid networks.

Telephone subsets normally couple a transmitter and a receiver to a two-way, two-wire line. Conventionally, the connections are made via an inductive bridge called a hybrid network. This network provides three paths which are balanced so that the transmitter can send to the line and the receiver can receive the line, but the transmitter and receiver are effectively isolated from each other—except for a slight sidetone unbalance which is desirable so that the subscriber may hear himself talking.

The inductive bridge type of hybrid network functions very well; however, it tends to prevent modernization of the instrument. First, inductors cannot be made from integrated circuits. Second, inductors draw large currents and impose serious power supply requirements. Third, inductors are inherently expensive to make. All of these drawbacks are overcome through a use of a resistor-type hybrid network. However, inductive networks continue to be used because purely resistive networks have not heretofore been completely satisfactory either.

Accordingly, an object of this invention is to provide new and improved telephone sets and especially telephone sets using resistive hybrid networks. A more particular object is to provide a combination of resistors and semiconductor devices which overcome the drawbacks of both the inductive and purely resistive hybrid networks.

A more particular object is to provide a hybrid network which is adapted to be constructed, primarily through a use of integrated circuits.

Yet another object is to reduce the power drain heretofore required by inductive hybrid networks. More precise objects are to eliminate network transformers without making the circuit unduly complicated, and to make a network which is insensitive to frequency differences and changes in line impedance.

In keeping with an aspect of the invention, these and other objects are accomplished by a use of a diamond shaped bridge circuit having a pair of oppositely directed amplifier means in opposite arms thereof. The other two opposite arms of the bridge are resistive and capacitive. A difference amplifier is coupled across diagonal node points on the bridge. A transmitter drives into each of the oppositely directed amplifiers which simultaneously produce output voltages that are approximately equal. The inputs of the difference amplifier are connected across the oppositely directed amplifier outputs so that no signal results from the simultaneous outputs of these two amplifiers. The other two node points on the bridge are connected to a telephone line. Therefore, the oppositely directed amplifiers drive into the line to send a signal to the central office; they produce a voltage difference across the two node points connected to the difference amplifier because of currents appearing in the resistive-capacitive arms to the bridge.

The above mentioned and other features and objects of this invention and the manner of obtaining them will become more apparent, and the invention itself will be best understood by reference to the following description of an embodiment of the invention taken in conjunction with the accompanying drawings, in which.

Figure 1:
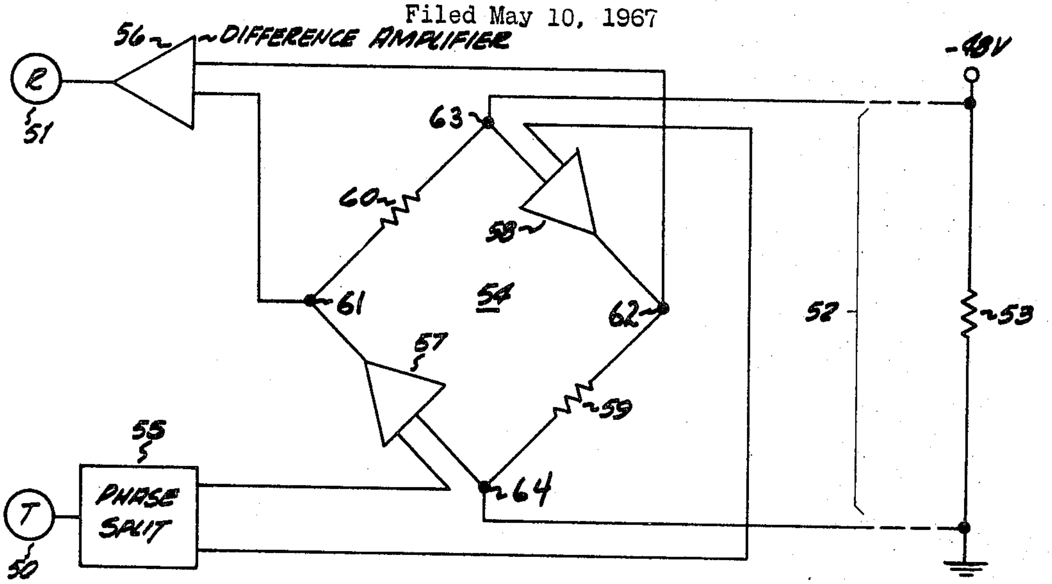
FIG. 1 is a block diagram of the network used in a telephone sub-set which incorporates the principles of the invention.

The telephone set of FIG. 1 includes a transmitter 50, receiver 51, telephone line 52, and load 53 (which may be the central office equipment), all of which are conventional. Interconnecting these conventional elements are a transmission bridge 54, a phase splitter circuit 55, and a difference amplifier 56.

The bridge 54 is a diamond shaped non-inductive circuit having four node points 61–64 joining four arms of the diamond shape. Oppositely directed amplifiers 57, 58 are connected in one pair of opposite arms and resistive elements 59, 60 are connected in the other pair of opposite arms. The transmitter 50 is coupled through the phase splitter 55 to the inputs of the two amplifiers 57, 58. The bridge 54 is balanced across the node points 61, 62 with respect to signals from the transmitter 50. Thus, there is a null or practically zero voltage difference across terminals 61, 62 responsive to the output of the transmitter 50. The small amount of voltage difference remaining is that required for sidetone. The bridge 54 is unbalanced across the node points 61, 62 with respect to signals received at the node points 63, 64 from the line 52. Thus, the receiver 51 receives a small sidetone signal from the transmitter 50 and a large voice signal from the line 52. All power required to operate the circuits shown in FIG. 1 comes from the −48 v. and ground terminals of the central office battery.

Figure 2:
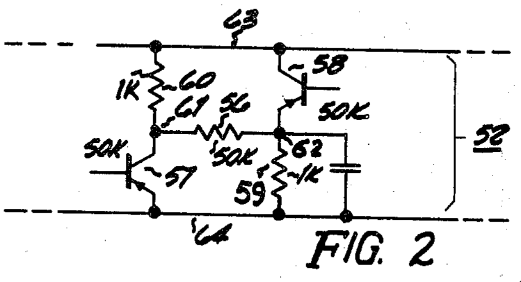
FIG. 2 is a simplified version of the network showing some of the components used therein.

The principles of the bridge 54 are shown in FIG. 2. The transmitter 50 output signal is applied through the phase splitter 55 (not shown in FIG. 2) to the bases of the transistor 57, 58 which drive out onto the line 52 with almost no voltage difference appearing across the terminals 61, 62. Signals incoming over the line see a resistance of about 50K at the transistors 57, 58 and a resistance of 1K at the resistor 59. The resistor 60 is bypassed for A.C. signals so that the voice path sees almost no impedance to the points 61, 62. The transistor 57 is used as an emitter follower, and the transistor 58 is used as a common emitter. Therefore, there is a phase inversion in the transistor 58—but not in the transistor 57. Thus, there is a phase difference of 180° and that difference causes a maximum potential difference to appear across the resistor 56 which represents the input impedance of the difference amplifier 56. Hence, any A.C. signal incoming over the line 52 is directed into the difference amplifier 56. The amplifiers 57, 58 do not amplify the incoming signal which is received over the line 52.

Figure 3:
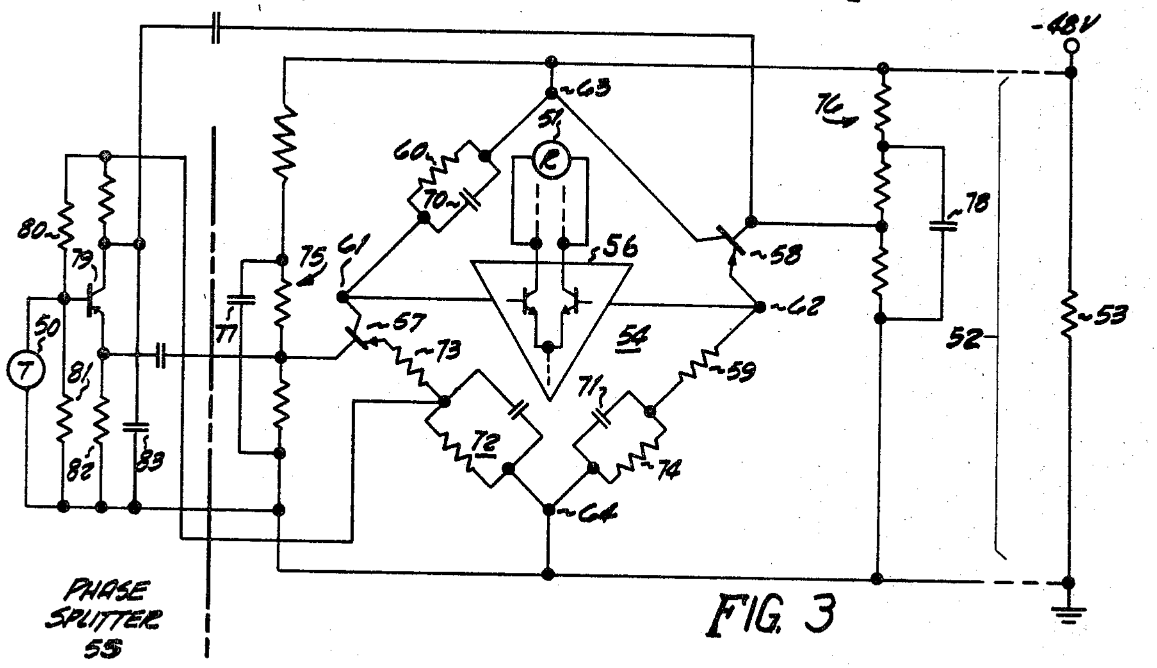
FIG. 3 is a schematic circuit diagram showing the components which are used to complete the blocks of FIG. 1.

The circuit for accomplishing these functions is shown in FIG. 3. The reader may orient FIGS. 1–3 by comparing the reference numerals in each.

A pair of opposite arms in the bridge 54 include oppositely directed amplifiers in the form of the transistor 57 used in a common emitter configuration and the transistor 58 used in a common collector or emitter follower configuration. The other pair of opposite arms include the resistors 74, 60 which are by-passed by the capacitors 70, 71, respectively. The emitter of transistor 57 is biased via resistor 73 and an RC biasing combination 72 which provides a D.C. power input for both the transistor 57 and the phase splitter 55. The emitter of the transistor 58 is biased via resistor 59 and a network in which the capacitor 71 is an A.C. by-pass and the resistor 74 is a current limiter. The base bias voltages for the transistors 57, 58 are supplied by the voltage dividers 75, 76, respectively, each having an A.C. by-pass 77, 78 for signals appearing on the line 52. The transistor 58 is connected as an emitter follower having a large series resistance 59 in the emitter circuit. The collector-emitter circuit of the transistor 58 and the large resistor 59 are connected in series between the line conductors. The other transistor 57 is connected as a grounded emitter circuit having resistors 60, 73 in both the collector and emitter circuits. The remote end of the collector resistor 60 is connected to the line conductor to which the collector of the emitter follower transistor 58 is also connected.

The differential amplifier 56 includes a conventional circuit having two transistors with their emitters tied together and the receiver coupled between their collectors. The emitter of the emitter follower transistor 58 and the collector of the grounded emitter transistor 57 are connected to the bases of the transistors in the differential amplifier 56. The signal for driving these two transistors is applied to the two bases 180° out of phase with each other.

The phase splitter 55 includes a PNP transistor 79 in a common emitter configuration. A voltage divider 80, 81 supplies base bias, and resistor 82 supplies emitter bias to the transistor 79. The capacitor 83 shunts the collector to ground to stabilize the circuit against oscillation.

The voltage gains of the phase splitter 79 and the bridge transistors 57, 58 are adjusted so that the voltages at points 61, 62 of the bridge 54, to which the differential amplifier 56 is connected, are approximately equal in magnitude and in phase with each other when the transmitter 50 is being used. Since the outputs of the transistors 57, 58 are phase shifted 180° with respect to each other, there is virtually no voltage difference across the difference amplifier 56, and almost no signal appears in the receiver 51. However, the signal current from the transmitter 50 does produce a current which flows in the two bridge transistors 57, 58 and which is arranged to be unequal at the points 63,64, thereby producing a net resulting signal current on the line 52 and in the central office represented by the load at 53.

Since this arrangement mainly cancels the transmitter 50 caused voltage across the differential amplifier input, the signal which the transmitter 50 feeds into the amplifier 56 is comparatively smaller than the signal which the transmitter 50 feeds onto the line 52. Thus, the output of the differential amplifier 56 appears as a small amplitude sidetone signal when the transmitter is being used. However, because of the filtering action of the capacitors 77, 78, the two bridge transistors 57, 58 receive no input responsive to the signal placed on the line 52 at the central office when another subscriber is talking. Hence, these transistors 57, 58 present a high impedance to the signals from the distant office. Nevertheless, a proper signal path does extend to the differential amplifier 56 which may be traced from the line conductors 52 through the collector resistor 60 of the grounded emitter transistor 57 and from line 52 to the emitter resistor 59 of the emitter follower transistor 58. Since the impedance of the differential amplifier input can be made much higher than the resistance of either of these resistors, almost the entire voltage appearing across the line, when an external signal is applied to it, appears across the input of the differential amplifier. Thus, the incoming signal fed into the input of the differential amplifier 56 is considerably larger in magnitude than that fed into this amplifier responsive to the output of the transmitter 50.

This operation results in an anti-sidetone circuit for the person who is using the telephone, and it provides a signal gain in the signal sent to the remote end 53 of the line 52.

While the principles of the invention have been described above in connection with specific apparatus and applications, it is to be understood that this description is made only by way of example and not as a limitation on the scope of the invention.

I claim:

1. A non-inductive telephone subset comprising a bridge circuit having four node points joining four arms in a diamond shaped configuration, a pair of oppositely directed amplifiers in opposite arms thereof, whereby said amplifiers each have outputs connected to one of a first two of the diagonal node points and each have inputs connected to the other two of the diagonal node points, means including a difference amplifier coupled across the first two of the diagonal node points on said bridge, transmitter means coupled to the inputs of said oppositely directed amplifiers, and receiver means coupled across the outputs of said difference amplifier.

2. The subset of claim 1 and a telephone line coupled across the other two of the diagonal node points on said bridge.

3. The subset of claim 2 wherein the gains of said amplifiers are selected to provide a null balance across said first two node points responsive to a voltage output of said transmitter and to provide a voltage difference at said first two node points responsive to a voltage input at said other two node points.

4. The subset of claim 3 and means responsive to said null balance for feeding a side-tone signal to said receiver means.

5. The subset of claim 1 and phase splitting means coupled between said transmitter means and the inputs of said oppositely directed amplifier means to phase split the phase of signals originating at said transmitter means, said phase split of the signals originating at said transmitter means being adjusted to cause said bridge to be in balance with respect to said first two node points responsive to an output from said transmitter means.

6. The subset of claim 5 wherein one of said oppositely directed amplifiers has an output which is 180° out of phase with respect to the other of said oppositely directed amplifier, and means for connecting the outputs of said phase splitting means to said amplifiers for shifting the output of said one amplifier by another 180° whereby, there is a minimal difference voltage at the input of said difference amplifier responsive to the output of said transmitter and there is a maximum difference voltage responsive to voltages appearing across the other diagonal two node points.

7. A non-inductive telephone set comprising an incoming two wire line, a transmission bridge, means for individually connecting each wire of said two wire line to a first two opposite nodes of said transmission bridge, a difference amplifier, means for connecting said difference amplifier to a second two opposite nodes of said transmission bridge, means including impedances in the arms of said transmission bridge for directing virtually the entire incoming current on said two wire lines into said difference amplifier, means for connecting the output of said difference amplifier to the receiver of said telephone set, and means for connecting the transmitter of said telephone set into the transmission bridge circuit for balancing the inputs to said difference amplifier responsive to voltages transmitted from said transmitter of said telephone set for directing the transmitted voltages into said two wire line.

References Cited

UNITED STATES PATENTS

| | | |
|---|---|---|
| 2,629,024 | 2/1953 | Edwards. |
| 2,838,612 | 6/1958 | Pocock. |

KATHLEEN H. CLAFFY, Primary Examiner

W. A. HELVESTINE, Assistant Examiner

U.S. Cl. X.R.

330—146